United States Patent
Au et al.

(10) Patent No.: US 8,189,776 B2
(45) Date of Patent: May 29, 2012

(54) METHOD AND SYSTEM FOR ENCODING MULTIMEDIA CONTENT BASED ON SECURE CODING SCHEMES USING STREAM CIPHER

(75) Inventors: Oscar Chi Lim Au, Hong Kong (CN); Jiantao Zhou, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 460 days.

(21) Appl. No.: 12/562,975

(22) Filed: Sep. 18, 2009

(65) Prior Publication Data

US 2010/0067688 A1    Mar. 18, 2010

Related U.S. Application Data

(60) Provisional application No. 61/136,600, filed on Sep. 18, 2008.

(51) Int. Cl.
*H04L 29/06* (2006.01)
(52) U.S. Cl. .......................................................... 380/42
(58) Field of Classification Search ...................... 380/42
See application file for complete search history.

(56) References Cited

U.S. PATENT DOCUMENTS

| | | | |
|---|---|---|---|
| 4,926,475 A * | 5/1990 | Spiotta et al. ..................... 380/2 |
| 6,094,453 A | 7/2000 | Gosselin et al. |
| 6,195,368 B1 | 2/2001 | Gratacap |
| 6,246,701 B1 | 6/2001 | Slattery |
| 6,292,490 B1 | 9/2001 | Gratacap et al. |
| 6,324,573 B1 | 11/2001 | Rhoads |
| 6,385,251 B1 | 5/2002 | Talluri et al. |
| 6,400,996 B1 | 6/2002 | Hoffberg et al. |
| 6,411,725 B1 | 6/2002 | Rhoads |
| 6,418,424 B1 | 7/2002 | Hoffberg et al. |
| 6,590,998 B2 | 7/2003 | Rhoads |
| 6,594,373 B1 | 7/2003 | Gustafson |
| 6,621,869 B2 | 9/2003 | Talluri et al. |
| 6,646,578 B1 * | 11/2003 | Au ................................. 341/67 |

(Continued)

FOREIGN PATENT DOCUMENTS

EP    1750446 A2    2/2007

(Continued)

OTHER PUBLICATIONS

Chen et al., "Implementation of H.264 on PLX," in Hardware Software Co-Design of a Multimedia SOC Platform, Chapter 6, 115-128 (Springer Science & Business Media B.V., Doetinchem, The Netherlands, Apr. 1, 2009).

(Continued)

*Primary Examiner* — Michael S McNally
(74) *Attorney, Agent, or Firm* — Leydig, Voit & Mayer, Ltd.

(57) ABSTRACT

Described herein are various embodiments of a coding technique that utilize a stream cipher for switching between first and second coding conventions for encoding a symbol sequence. The first coding convention specifies a first mapping between a symbol and a first codeword and the second coding convention specified a second mapping between the symbol and a second codeword. According to the invention, a key generated by the stream cipher is used to selected one of the first and second coding convention and the mapping of the selected coding convention is then utilized for encoding the symbol.

20 Claims, 4 Drawing Sheets

U.S. PATENT DOCUMENTS

| | | | |
|---|---|---|---|
| 6,744,387 | B2 | 6/2004 | Winger |
| 6,744,785 | B2 | 6/2004 | Robinett et al. |
| 6,915,002 | B2 | 7/2005 | Gustafson |
| 6,934,679 | B2 | 8/2005 | Zhou et al. |
| 6,959,386 | B2 | 10/2005 | Rhoads |
| 6,982,663 | B2 | 1/2006 | Winger |
| 7,050,603 | B2 | 5/2006 | Rhoads et al. |
| 7,058,697 | B2 | 6/2006 | Rhoads |
| 7,120,253 | B2 | 10/2006 | Ducharme et al. |
| 7,132,964 | B2 * | 11/2006 | Tsuru ............................... 341/67 |
| 7,143,030 | B2 | 11/2006 | Chen et al. |
| 7,155,383 | B2 | 12/2006 | Chen et al. |
| 7,165,180 | B1 | 1/2007 | Ducharme |
| 7,221,761 | B1 | 5/2007 | Deshpande et al. |
| 7,240,001 | B2 | 7/2007 | Chen et al. |
| 7,242,988 | B1 | 7/2007 | Hoffberg et al. |
| 7,249,016 | B2 | 7/2007 | Chen et al. |
| 7,266,693 | B1 | 9/2007 | Potter et al. |
| 7,287,275 | B2 | 10/2007 | Moskowitz |
| 7,299,190 | B2 | 11/2007 | Thumpudi et al. |
| 7,308,402 | B2 | 12/2007 | Zhou et al. |
| 7,336,788 | B1 | 2/2008 | Hendricks |
| 7,343,492 | B2 | 3/2008 | Moskowitz et al. |
| 7,346,472 | B1 | 3/2008 | Moskowitz et al. |
| 7,362,775 | B1 | 4/2008 | Moskowitz |
| 7,406,176 | B2 | 7/2008 | Zhu et al. |
| 7,409,073 | B2 | 8/2008 | Moskowitz et al. |
| 7,428,639 | B2 | 9/2008 | Demos |
| 7,436,976 | B2 | 10/2008 | Levy et al. |
| 7,437,430 | B2 | 10/2008 | Rhoads |
| 7,447,372 | B2 | 11/2008 | Kishore et al. |
| 7,457,962 | B2 | 11/2008 | Moskowitz |
| 7,475,246 | B1 | 1/2009 | Moskowitz et al. |
| 7,496,143 | B2 | 2/2009 | Schwarz et al. |
| 7,502,743 | B2 | 3/2009 | Thumpudi et al. |
| 7,519,228 | B2 | 4/2009 | Cho et al. |
| 2002/0094081 | A1 * | 7/2002 | Medvinsky ...................... 380/44 |
| 2005/0169473 | A1 * | 8/2005 | Candelore ...................... 380/239 |
| 2007/0009047 | A1 * | 1/2007 | Shim et al. ............... 375/240.26 |
| 2007/0286277 | A1 | 12/2007 | Chen |
| 2008/0260028 | A1 | 10/2008 | Lamy-Bergot et al. |

FOREIGN PATENT DOCUMENTS

| | | |
|---|---|---|
| EP | 1868388 A2 | 12/2007 |
| WO | WO 2006/067172 A1 | 6/2006 |

OTHER PUBLICATIONS

Lian, "Compression-Combined Encryption," in Multimedia Content Encryption: Techniques and Applications, Chapter 6, 89-108 (Auerbach Publications, Boca Raton, Florida, U.S.A., Sep. 17, 2008).

Wang et al., In 4G Wireless Video Communications, Chapter 1, 1-18 (John Wiley & Sons Ltd., Chichester, U.K., Jun. 2009).

Gangretto et al., "Multimedia selective encryption by means of randomized arithmetic coding," *IEEE Transact. Multimedia*, 8 (5): 905-917 (Oct. 2006).

Li et al., "On using exponential-Golomb codes and subexponential codes for system-on-a-chip test data compression," *J. Electron. Testing*, 20: 667-670 (2004).

Bergeron et al., "Compliant selective encryption for H.264/AVC video streams," 2005 IEEE 7th Workshop on Multimedia Signal Processing, 1-4 (Oct. 30-Nov. 2, 2005).

Kim et al., "Secure arithmetic coding," IEEE Trans. Signal Processing, 55 (5): 2263-2272 (May 2007).

Kirchhoffer et al., "Context-adaptive binary arithmetic coding for frame-based animated mesh compression," 2008 IEEE International Conference on Multimedia & Expo (ICME 2008), 341-344 (Jun. 23-26, 2008).

Lee et al., "Low complexity controllable scrambler/descrambler for H.264/AVC in compressed domain," Proceedings of the 14th Annual ACM International Conference on Multimedia (MM'06), 93-96 (Oct. 23-27, 2006).

Li et al., "NAL level encryption for scalable video coding," 2008 9th Pacific-Rim Conference on Multimedia (PCM 2008), 496-505 (Dec. 9-13, 2008).

Lian et al., "Commutative encryption and watermarking in video compression," IEEE Trans. Circuits and Syst. Video Technol., 17 (6): 774-778 (Jun. 2006).

Lian et al., "Efficient video encryption scheme based on advanced video coding," Multimed. Tools Appl., 38:75-89 (Published online Jul. 28, 2007).

Lian et al., "Secure advanced video coding based on selective encryption algorithms," IEEE Trans. Consumer Electron., 52 (2): 621-629 (2006).

Lian et al., "Selective video encryption based on advanced video coding," in Advances in Multimedia Information Processing—PCM 2005 (Ho et al., Eds.), 281-290 (Springer-Verlag, Heidelberg-Berlin, Germany, Nov. 2005).

Magli et al., "Conditional access techniques for H.264/AVC and H.264/SVC compressed video," IEEE Trans. Circuits and Syst. Video Technol., Accepted for publication. Downloaded from http://citeseerx.ist.psu.edu/viewdoc/download?doi=10.1.1.103.5599&rep=rep1&type=pdf on Mar. 2, 2010.

Marpe et al., "Efficient representation and coding of prediction residuals and parameters in frame-based animated mesh compression," 2008 IEEE International Conference on Image Processing (ICIP 2008), 2680-2683 (Oct. 12-15, 2008).

Park et al., "Combined scheme of encryption and watermarking in H.264/Scalable Video Coding (SVC)," New Directions in Intelligent Interactive Multimedia (Tsihrintzis et al., Eds.), 142: 351-361 (Sep. 9, 2008).

Park et al., "Efficient selective encryption scheme for the H.264/Scalable Video Coding (SVC)," IEEE Fourth International Conference on Networked Computing and Advanced Information Management (NCM 2008), 371-376 (Sep. 2-4, 2008).

Tanizawa et al., "Fast rate-distortion optimized coding mode decision for H.264," Electronics and Communications in Japan, Part 3, 90 (9): 41-55 (2007). Translated from Denshi Joho Tsushin Gakkai Ronbunshi, J89-D (1): 27-39 (Jan. 2006).

Wen et al., "A format-compliant configurable encryption framework for access control of video," IEEE Trans. Circuits and Syst. Video Technol., 12 (6): 545-557 (Jun. 2002).

Wu et al., "Design of integrated multimedia compression and encryption systems," IEEE Trans. Multimedia, 7 (5): 828-839 (Oct. 2005).

Zheng et al., "3G wireless multimedia: technologies and practical issues," Wireless Communications and Mobile Computing, 2 (6), 563-572 (Oct. 30, 2002).

Zhou et al., "Security analysis of multimedia encryption schemes based on multiple Huffman table," IEEE Signal Processing Letters, 14 (3): 201-204 (Mar. 2007).

Bose et al., "A novel compression and encryption scheme using variable model arithmetic coding and couple chaotic system," IEEE Trans. Circuits and Syst. I, 53: 848-857 (Apr. 2006).

Zhou et al., "Security analysis of multimedia encryption schemes based on multiple Huffman table," IEEE Signal Proc. Letters, 14 (3): 201-204 (Mar. 2007).

Zhou et al., "Adaptive chosen-ciphertext attack on secure arithmetic coding," IEEE Trans. Signal Proc., 57 (5): 1825-1838 (May 2009).

* cited by examiner ion by alternately using different Huffman trees in a secret order, without influencing the coding efficiency. This technique, however, is vulnerable to chosen-plaintext attacks as shown in J. Zhou, Z. Liang, Y. Chen, and O. C. Au "Security analysis of multimedia encryption schemes based on multiple Huffman table," IEEE Signal Processing Letters, vol. 14, no. 3, pp. 201-204, March 2007 (hereinafter "Zhou"), which is hereby incorporated by reference.

METHOD AND SYSTEM FOR ENCODING MULTIMEDIA CONTENT BASED ON SECURE CODING SCHEMES USING STREAM CIPHER

CROSS-REFERENCE TO RELATED APPLICATIONS

This patent application claims the benefit of U.S. Provisional Patent Application No. 61/136,600, filed Sep. 18, 2008, which is incorporated by reference in its entirety.

TECHNICAL FIELD

The present invention is related in general to data encoding and encryption, and in particular to encoding multimedia content based on secure coding schemes using stream cipher.

BACKGROUND OF THE INVENTION

The widespread use of multimedia content, multimedia security and digital rights management have become very important issues. A straightforward approach to protect multimedia data is using the traditional encryption methods such as the Advanced Encryption Standard (AES) and Data Encryption Standard (DES) encryptions to encrypt the entire data. Nevertheless, encryption of multimedia files has to be carried out carefully. On one hand, encrypting and decrypting compressed multimedia files cause excessive computational burden and power consumption at the encoder and decoder and hence the server and transcoder. More importantly, compressed multimedia files typically have well-defined hierarchical structures that can be exploited using many techniques such as scalability, transcoding, and rate shaping. However, these structures are no longer recognizable once the data are encrypted.

In cryptography, ciphertext is the result of the encryption process that transforms original unencrypted information (commonly called plaintext) using cipher to make it unreadable to anyone except those possessing special knowledge (usually referred to as a key).

A cryptographic attack is a method for circumventing the security of a cryptographic system by finding a weakness in a code, cipher, cryptographic protocol or key management scheme. This process is also called "cryptanalysis". In cryptanalysis, the most common cryptographic attacks include chose-plain text attack and chose-ciphertext attack. A chosen-plaintext attack is an attack model for cryptanalysis that presumes that an attacker has the capability of choosing arbitrary plaintext to be encrypted and obtaining the corresponding ciphertext. The goal of the attack is to gain some further information that reduces the security of the encryption scheme. In the worst case, a chosen-plaintext attack could reveal the scheme's secret key. A chosen-ciphertext attack is an attack model for cryptanalysis in which the attacker gathers information, at least in part, by choosing a ciphertext and obtaining its decryption under an unknown key.

The recent trend in multimedia encryption has drawn more attention to integrating encryption and compression by introducing randomness into the entropy coder such as the Huffman coder and arithmetic coder. These encryption schemes employ joint encryption-compression approaches where encryption and compression can be achieved in one single step. In C. Wu and C. C. J. Kuo "Design of integrated multimedia compression and encryption systems," IEEE Transactions on Multimedia, vol. 7, pp. 828-839, October 2005, a Multiple Huffman Tree (MHT) technique encrypts the infor- Compared with the Huffman coding, the arithmetic coding (AC) is capable of offering higher coding efficiency, and thus is becoming more and more popular in the new generation of data compression standards such as JPEG 2000 and H.264.

In M. Grangetto, E. Magli, and G. Olmo "Multimedia selective encryption by means of randomized arithmetic coding," IEEE Transactions on Multimedia, vol. 8, pp. 905-917, October 2006, an efficient encryption scheme based on AC randomly swaps the least probable symbol (LPS) and the most probably symbol (MPS) within the coding interval.

In R. Bose and S. Pathak "A novel compression and encryption scheme using variable model arithmetic coding and couple chaotic system," IEEE Transactions on Circuits and Systems I, vol. 53, pp. 848-857, April, 2006, an encryption technique has a variable model arithmetic coder integrated with a coupled chaotic system.

More recently, in H. Kim, J. T. Wen, and J. D. Villasenor "Secure arithmetic coding," IEEE Transactions on Signal Processing, vol. 55, pp. 2263-2272, May 2007, a secure arithmetic coding (SAC) system is described, which is claimed to be both secure and efficient. This technique, however, is subject to the chosen-ciphertext attack.

In data compression, a prefix code is a code system, typically a variable-length code, with the "prefix property," meaning that there is no valid code word in the system that is a prefix (start) of any other valid code word in the set. For example, a code with code words {9, 59, 55} has the prefix property, whereas a code consisting of {9, 5, 59, 55} does not, because "5" is a prefix of both "59" and "55". With a prefix code, a decoder/receiver can tell the end of a codeword without using a special marker.

A universal code is a prefix code that maps positive integers to their corresponding binary codewords. For a universal code, no matter what the true probability distribution of the integers is, as long as the distribution is monotonic (i.e., $p(i) \geq p(i+1)$ for all positive integer i), the expected lengths of the codewords are within a constant factor of the expected lengths that the optimal code for that source probability distribution would have assigned. That is, given an arbitrary source with nonzero entropy, a universal code achieves average codeword length, which is at most a constant times the optimal possible for that source. Typical universal codes include Elias gamma coding, Elias delta coding, Elias omega coding, Fibonacci coding, Levenstein coding, and Exp-Golomb coding. In particular, Elias gamma coding is a special case of the Exp-Golomb coding which is currently used in the H.264/MPEG-4 AVC video coding standard.

In order to improve the security of the universal codes, efforts have been made to combine coding with data encryption. For example, S. Lian et al. "Secure advanced video coding based on selective encryption algorithms," IEEE Tran. Consumer Electronics, vol. 52, no. 2, pp. 621-629, May 2006 (hereinafter "Lian"), describes an Exp-Golomb encryption algorithm (EGEA) as illustrated in FIG. 1. Each Exp-Golomb codeword has a form 00 . . . 01Y having a series of R leading zeros, one "1"-bit separator, and R bits of information Y. Let S be an input symbol to be encoded. According to Lian, the encoding process of EGEA is described as follows:

Step 1: encoding symbol S into codeword Y using the regular Exp-Golomb coding; and Step 2: performing an logic exclusive-or (XOR) operation on the codeword Y and a key stream K: $Z=Y \oplus K$.

Therefore, the resulting codeword has the form of 00 . . . 01Z with R bits of leading zeros, one bit of "1" representing the separator, and R bits of encrypted information Z. However, it should be noted that it is still unclear how the codeword "1" should be treated in Lian's encryption technique. In other words, according to Lian, one would not know whether the XOR operation should be performed when the codeword "1" is encountered. In fact, no matter whether the XOR operation is performed on the codeword "1," the coding technique described by Lian has serious problems.

In particular, if the XOR operation is not performed on the codeword "1," in the bit stream generated according to Lian's technique, it is not difficult to determine the boundary of different codewords. Because "1" is not encrypted using the key stream K, one can immediately recover the corresponding symbols. Because the codeword length of "1" is 1, one can roughly estimate the probability of the symbols associated with "1" as $2^{-1}$. Therefore, in this case, an attacker can recover half of the symbols by only observing the ciphertext (ciphertext-only attack).

If, on the other hand, the XOR operation is performed on the codeword "1." In this case, the codeword "1" may be flipped to "0," depending on the key stream, which cannot be discriminated from the leading "0s." This may lead to the decoding failure. For example, the symbol sequence to be encoded is $a_0 a_4 a_1$, and the key stream is 101010. Hence, the encoded bit stream is 000100010. However, if the symbol sequence to be encoded is $a_{12} a_0 a_0$, it is not difficult to verify that the encoded bit stream is also 000100010. Therefore, on the decoder side, it is impossible to distinguish the correct symbol sequence from which the codewords were obtained.

Therefore, it is desired to design an encryption technique for universal codes that is secure under both ciphertext and plaintext attacks. It is also desired to design an encryption technique for universal codes that minimize decoding errors.

BRIEF SUMMARY OF THE INVENTION

Described herein is a data encoding method and system utilizing a universal coding technique and a stream cipher. Unlike traditional techniques, which apply an exclusive-or (XOR) operation on the encrypted bitstream (commonly called plaintext) and the key stream generated by the stream cipher, various embodiments of the invention use the key stream to control the switching between two coding conventions for encoding the source. Compared with regular universal coding techniques, the invention provides high level security with very low computational complexity. In addition, in some practical applications where only a ciphertext-only attack is feasible, a pre-generated cyclic key stream can be utilized to control the switching without incurring any security degradation.

According to some embodiments, a method for encrypting data using a key stream comprises obtaining a symbol and a cipher key corresponding to the symbol, selecting one of first and second universal coding conventions in accordance with the cipher key, and encoding the symbol to a codeword in accordance with the selected universal coding convention. In keeping with these embodiments, the key stream is generated by the stream cipher and the cipher key is selected from the key stream.

According to one further embodiment, the first universal coding convention specifies a first mapping between the symbol and a first codeword and the second universal coding convention specified a first mapping between the symbol and a second codeword. Accordingly, the mapping of the selected coding convention is used for encoding the symbol.

In keeping with this embodiment, the first mapping is defined by a first coding table and the second mapping is defined by a second coding table. The symbol is encoded by searching in the coding table of the selected coding convention for codeword that is mapped to the symbol. In particular, when a value of the cipher key is zero (0), the first coding convention is selected. Accordingly, the symbol is encoded to the first codeword by searching in the first coding table for the first codeword. When the value of the cipher key is one (1), the second coding convention is selected. Accordingly, the symbol is encoded to the second codeword by searching in the second coding table for the second codeword.

Alternatively, the first mapping is defined by a first computational process and a second mapping is defined by a second computational process. Accordingly, when the cipher key is zero (0), the first computational process is selected for generating the first codeword from the symbol. When the cipher key is one (1), the second computational process is selected for generating the second codeword from the symbol.

In keeping with the above embodiments, the stream cipher for generating the key stream is selected from a group of A5/1, A5/2, FISH, Grain, HC-256, ISAAC, MUGI, PANAMA, Phelix, Pike, Py, Rabbit, RC4, Salsa20, Scream, SEAL, SNOW, SOBER-128, SOSEMANUK, Trivium, Turing, VEST, and WAKE.

In addition, the first and second coding conventions both comply with a coding scheme selected from a group of Elias gamma coding, Elias delta coding, Elias omega coding, Exp-Golomb coding, Fibonacci coding, and Levenstein coding. Alternatively, the first and second coding conventions comply with difference coding schemes selected from a group of Elias gamma coding, Elias delta coding, Elias omega coding, Exp-Golomb coding, Fibonacci coding, and Levenstein coding.

In keeping with the above embodiments, a method for encoding a sequence of symbols comprises generating a key stream corresponding to the sequence of symbols and switching between first and second coding tables in accordance with the key stream for encoding the sequence of symbols. More particularly, the first coding table specifies a first mapping between each one of the sequence of symbols and a first set of codewords and the second coding table specifies a second mapping between each one of the sequence of symbols and a second set of codewords.

In addition, the method further comprises performing the following steps until the sequence of symbols is exhausted: (a) retrieving a symbol from the sequence of symbols and a key from the key stream; (b) selecting one of the first and second coding tables based on the key; (c) searching for a codeword that is mapped to the symbol in the selected coding table; and (d) outputting the codeword into a bit stream.

Still in keeping with the above embodiments, there is provided a computer readable medium having program codes executable by one or more digital processors for encoding a symbol. The program codes comprises instructions for generating a key stream having a key corresponding to the symbol, instructions for selecting one of first and second universal coding conventions in accordance with the key, and instructions for encoding the symbol in accordance with the selected universal coding convention. Furthermore, the first universal coding convention specifies a first mapping between the symbol and a first codeword and the second universal coding convention specifies a second mapping between the symbol and a second codeword.

More particularly, the key has a value selected from zero (0) and one (1). Accordingly, the program codes further comprises instructions for determining the value of the key to be zero (0), instructions for selecting the first universal coding convention in response to the value of the key, instructions for obtaining the first codeword associated with the symbol in accordance with the first mapping of the first universal coding convention, and instructions for outputting the first codeword. In addition, the program codes further comprises instructions for determining the value of the key to be one (1), instructions for selecting the second coding table in response to the value of the key, instructions for obtaining the second codeword associated with the symbol in accordance with the second mapping of the second universal coding convention.

BRIEF DESCRIPTION OF THE SEVERAL VIEWS OF THE DRAWING(S)

FIG. 2 (b) depicts a schematic diagram of another system using a pseudo-random number generator to selected one of the two universal coding conventions for encoding the symbol;

FIG. 2 (c) depicts a schematic diagram of still another system using pre-generated cipher stream to selected one of the two universal coding conventions for encoding the symbol;

DETAILED DESCRIPTION OF THE INVENTION

Figure 1:
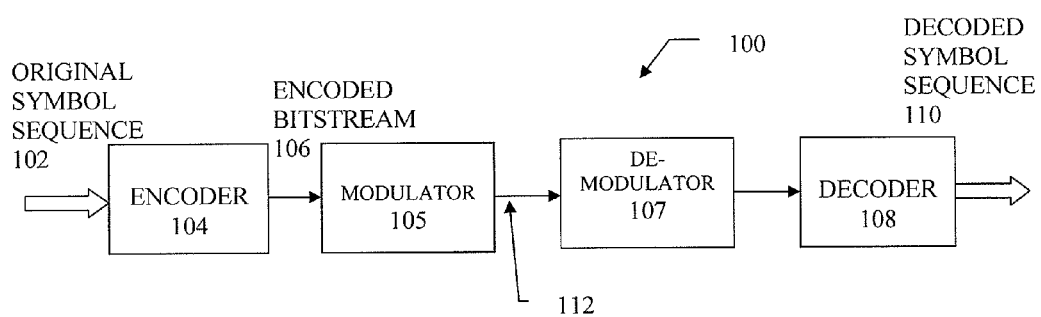
FIG. 1 depicts a schematic diagram of a system for encoding and transmitting source symbols.

Now turning to the drawings, FIG. 1 depicts a system 100 for transmitting multimedia information using data coding and compression techniques. Specifically, at transmitter 101, original symbols sequence 102 (also called source) representing underlying multimedia data information such as digital videos, audios, and images are encoded by encoder 104 using a coding technique. Encoded bitstream 106 including a sequence of binary bits is then modulated onto signals that are suitable for transmission over the physical channel 112 and transmitted to the receiver 109. At the receiving end, the received signals are first demodulated by demodulator 107 and then decoded by decoder 108 to obtain decoded symbols 110, which may or may not be the same as the same as original symbols 102 due to the degradations during the transmission over channel 112.

Most sources representing multimedia information contains redundancies, which, if transmitted without compression, wastes communication bandwidth and other resources. One goal of decoder 104 is therefore to remove the redundancies from the source using data compression techniques such as the universal coding techniques described above. In general, incoming symbol sequence 102 (i.e., source) has certain characteristics, such as the probabilities of each symbol occurrence within the source, the entropy of the source, the alphabet of the source. The coding technique used by encoder 104 depends in part on these characteristics of the source. In particular, the coding technique is optimized according to the source characteristics so that as fewer bits as possible are used to represent the original symbol sequence 102.

In order to improve the security of the transmission and prevent hacker attacks, another goal of the encoder 104 is to encrypt the original symbol sequence 102 so that only the decoder having the correct key can currently recover the source information. Data encryption performed by encoder 104 is based on the use of algorithms to scramble (encrypt) the source information (i.e. plaintext) into unintelligible babble (i.e. ciphertext). The operation of the algorithm requires the use of a key. In general, cryptography include two major categories, namely, symmetric and asymmetric encryptions. In symmetric encryption, the key used to encrypt the plaintext was the same as the key used to decrypt the ciphertext. On the other hand, asymmetric or public key encryption requires two keys, an unguarded public key used to encrypt the plaintext and a guarded private key used for decryption of the ciphertext. The two keys are mathematically related but cannot be deduced from one another. According to the invention, the cryptographic technique used by encoder 104 is preferably a stream cipher. In particular, a stream cipher is a symmetric key cipher where plaintext bits are combined with a pseudorandom cipher bit stream (commonly called key stream).

The transmission channel 112 shown in FIG. 1 can take many forms such as a telephone line, a wired network, a wireless network, an optical line, and a computer readable storage media including CD/DVD, floppy disk, flash memory, hard drive, etc. The modulation scheme used by the modulator 105 and demodulator 107 is selected from those well known in the art and preferably suitable for the form of the transmission channel.

Figure 2:
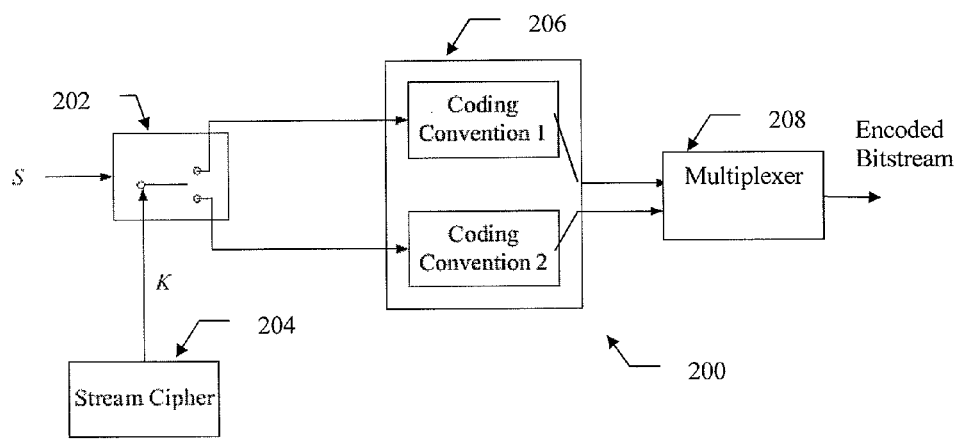
FIG. 2 (a) depicts a schematic diagram of a system using a stream cipher to select one of two universal coding conventions for encoding a symbol.

FIG. 2 (a) illustrates one embodiment of encoder 104 according to the invention. Unlike existing systems that perform data compression followed by encryption, encoder 104 integrates the tasks of compression and encryption and achieves simultaneous data compression and encryption.

Specifically, let the original symbol sequence to be encoded be S=s1s2 ... sN, and the first N bits of the key stream generated by the stream cipher be K=k1$k$2 ... kN. The encoder 104 performs the following steps until all symbols are encoded:

Step 1: Initializing i=1 and fetching the ith symbol from S. If ki=0, then encoding si using coding convention 1; if ki=1, then using coding convention 2 to encode si; and Step 2: Updating i=i+1 and going to Step 1.

Figure 2B:
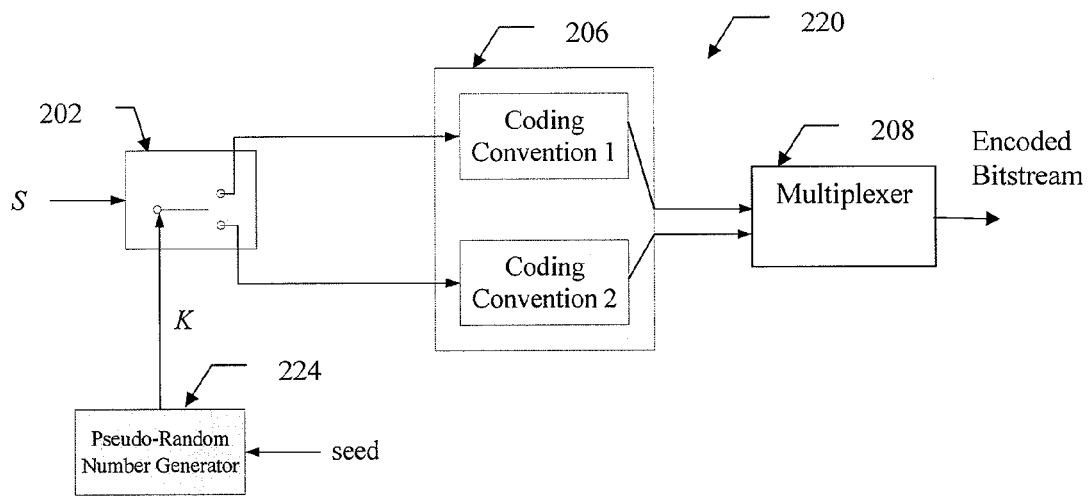
Figure 2C:
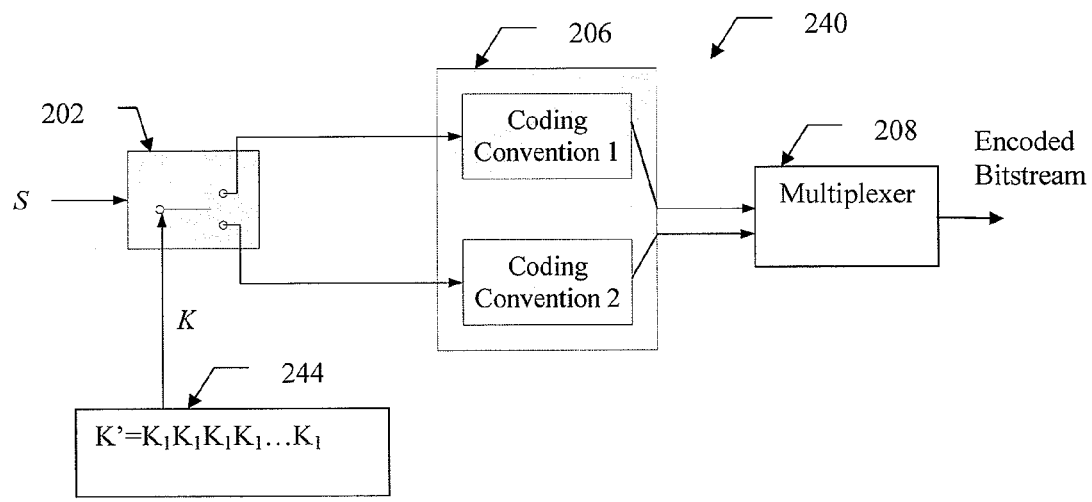

According to an alternative embodiment 220 in keeping with the invention, the key stream can be generated by a pseudo-random number generator using input seeds as shown in FIG. 2(b). In particular, the pseudo-random number generator can be implemented using a linear feedback shift register as well known in the art. In order to maintain the security of the encoder, the same seed for the pseudo-random number generator should not be used more than once.

To ensure the security of the encoder, key stream 204 or pseudo-random number generator 24 is different from a general random number generator, in that the period of the key stream generated by the stream cipher 204 or the pseudo-random number generator 224 is sufficiently large so that that the key stream will not repeat within a period of using it. As shown in FIG. 2(a) and (b), the additional overhead of the secure universal encoder 200 and 220 is primarily caused by the stream cipher 204 and the pseudo-random number generator 224.

In some scenarios, particularly, when only the encrypted data is available to the attacker, it is often practical to simplify the system by replacing the stream cipher 204 and the pseudo-random number generator 224 with a pre-generated cyclic key stream. Specifically, before the encoding is started, a key stream K1 having length M, which is sufficiently large, is generated by using an offline stream cipher or a pseudo-random number generator. The key stream K1 is then shared between the encoder and the decoder. Then, a cyclic key stream K' can be constructed as K'=K1K1K1 . . . . When the symbol sequence is encoded, a key is then retrieved form the cyclic key stream K' for switching between coding conventions 1 and 2. As a result, there is no need to use the stream cipher for generating the key. This significantly reduces the complexity of the secure encoder 240.

In keeping with the embodiments shown in FIG. 2 (*a*)-(*c*), the only private information in these systems is the seed/key used in the stream cipher. The seed/key is assumed to be 128 bits but can also include more or less than 128 bits.

TABLE 1

| Symbol | Exp-Golomb codes with leading zeroes | Exp-Golomb codes with leading ones |
|---|---|---|
| $a_0$ | 1 | 0 |
| $a_1$ | 010 | 100 |
| $a_2$ | 011 | 101 |
| $a_3$ | 00100 | 11000 |
| $a_4$ | 00101 | 11001 |
| $a_5$ | 00110 | 11010 |
| $a_6$ | 00111 | 11011 |
| $a_7$ | 0001000 | 1110000 |
| $a_8$ | 0001001 | 1110001 |
| $a_9$ | 0001010 | 1110010 |
| $a_{10}$ | 0001011 | 1110011 |
| $a_{11}$ | 0001100 | 1110100 |
| $a_{12}$ | 0001101 | 1110101 |
| $a_{13}$ | 0001110 | 1110110 |
| . | . | . |
| . | . | . |
| . | . | . |

According to a further embodiment in keeping with those shown in FIGS. 2 (*a*)-(*c*), coding convention 1 and coding convention 2 both comply with a universal coding technique such as Elias gamma coding, Elias delta coding, Elias omega coding, Fibonacci coding, Levenstein coding, and Exp-Golomb coding as well known in the art. For example as shown in Table 1, coding conventions 1 and 2 both utilize the Exp-Golomb code, where coding convention 1 uses leading zeros and coding convention 2 uses leading ones in their codewords.

As another example shown in Table 2, coding conventions 1 and 2 both utilize Elias delta codes, where coding convention 1 uses leading zeroes and coding convention uses leading ones in their codewords, respectively.

TABLE 2

| Symbol | Elias delta codes with leading zeroes | Elias delta codes with leading ones |
|---|---|---|
| $a_0$ | 1 | 0 |
| $a_1$ | 0100 | 1011 |
| $a_2$ | 0101 | 1010 |
| $a_3$ | 01100 | 10011 |
| $a_4$ | 01101 | 10010 |
| $a_5$ | 01110 | 10001 |
| $a_6$ | 01111 | 10000 |
| $a_7$ | 00100000 | 11011111 |
| $a_8$ | 00100001 | 11011110 |
| $a_9$ | 00100010 | 11011101 |
| $a_{10}$ | 00100011 | 11011100 |
| $a_{11}$ | 00100100 | 11011011 |
| $a_{12}$ | 00100101 | 11011010 |
| $a_{13}$ | 00100110 | 11011001 |
| . | . | . |
| . | . | . |
| . | . | . |

Figure 3:
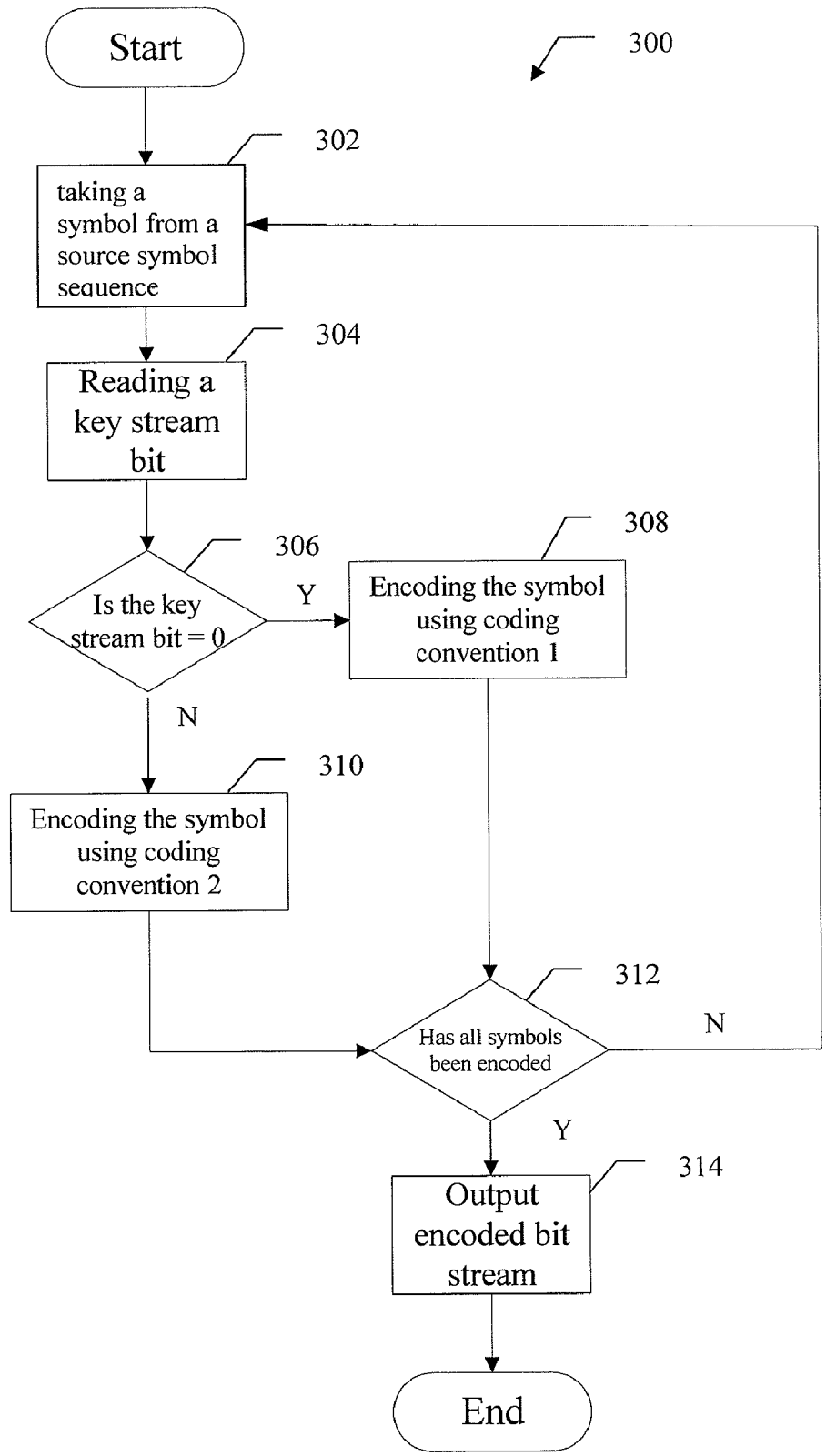
FIG. 3 depicts a method for encoding a symbol by switching between first and second coding conventions in accordance with a key.

According to an alternative embodiment in keeping with those shown in FIGS. 2(*a*)-(*c*), coding conventions 1 and 2 are selected from different coding techniques. For example, the Exp-Golomb codes using leading zeros as shown in Table 1 is selected as coding convention 1, while the Elias delta codes using leading ones as shown in Table 2 is selected as coding convention 2. One skilled in the art will recognize that coding conventions 1 and 2 can also be selected from other universal coding techniques such as Elias gamma coding, Elias omega coding, Fibonacci coding, and Levenstein coding. Furthermore, one skilled in the art will also readily recognize that when coding conventions 1 and 2 are selected from two different coding techniques, this will introduce some coding efficiency penalty since not all the coding techniques are optimal for a given source. In keeping with the embodiments described above in FIGS. 2(*a*) and (*b*), FIG. 3 illustrates a flow diagram of a method 300 implemented by an encoder for encoding a source symbol sequence. Specifically, at step 302, a symbol S is taken from the source symbol sequence for encoding. At step 304, a key stream bit is read from the key stream generated by the stream cipher or the random number generator. At step 306, method 300 determines the value of the key stream bit. If the value of the key stream bit is equal to zero (0), the symbol S is encoded using coding convention 2 (block 310). If the value of the key stream bit is equal to one (1), the symbol S is encoded using coding convention 1 (block 308). The above steps are repeated until all of the symbols in the symbol sequence are encoded (block 312). At step 314, the resulting bitstream is output. Again, coding conventions 1 and 2 can both comply with one universal coding technique as discussed above. Alternatively, they can be selected from different coding techniques.

The encoding steps involved in various universal coding schemes have been described in L. Li and K. Chakrabarty, "On Using Exponential-Golomb Codes and Subexponential Codes for System-on-a-Chip Test Data Compression," *Journal of Electronic Testing: Theory and Applications*, Vol. 20, pp. 667-67-, 2004, which is hereby incorporated by reference. In particular, the Exp-Golomb codes described in Table 1 has a coding order of 1. One skilled in the art will readily recognize, after reading this application, that Exp-Golomb codes with higher coding orders can also be utilized to encode the incoming symbol sequence.

Figure 4:
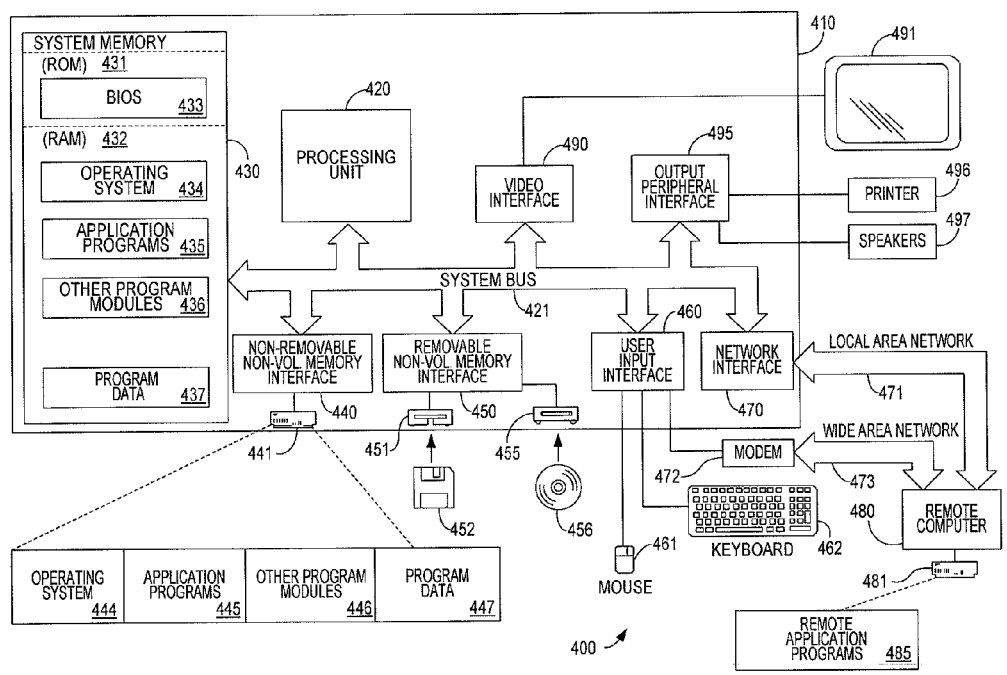
FIG. 4 depicts a computing environment for implementing the system and method according to various embodiments described herein.

FIG. 4 illustrates a computing environment 400 for implementing the encoder depicted in FIGS. 2(*a*) and (*b*) and the encoding method depicted in FIG. 3. According to this embodiment, the encoder and encoding method described above may be implemented as a software program running on a general purpose digital processor similar to device 410. Specifically, the software program for implementing the encoding method may include program codes for instructing various components of device 410 to execute the method steps or providing the encoding functions described above. For example, the program codes may include functional modules for providing the functions of stream cipher 204 and pseudo-random number generator 224, the universal coding unit 206 with two different coding conventions, the multiplexer 208, and the switch 202. Alternatively, the software program may include separate programs, each of which is executed independently for providing the functions of stream cipher 204, the universal coding unit 206, the switch 202, and the multiplexer 208. Regardless the structure of the software program, the program codes generally includes instructions for receiving input data including the source symbol sequence and other encoding parameters, instructions for generating the key stream using the stream cipher 202 or the pseudo-random number generator 224, instructions for encoding the symbol sequence by switching between the coding conventions 1 and 2 according to key stream, and instructions for multiplexing the encoded bits into a bitstream.

The software program may be implemented using standard programming languages such as C/C++, C#, Java, and Basic. Alternatively, it may be implemented in commercial computing platforms such as MATLAB. The software program may be a standalone program executable by device 410 independent from other programs running on device 410, or it may be a program embedded in other programs or operating system for providing data encoding and encryption. For example, it may be embedded into a video or audio coding system for providing data compression and encryption therein. The software program for implementing encoding system 400 may reside on non-removable memory 441, or the removable memory such as floppy disk 452 or CD/DVD 456. Upon starting the system 400 or receiving a user input through mouse 461 or keyboard 462 for executing the software program, the program codes may be loaded into memory space 435 associated with application programs in system memory 430.

On the other hand, the data to be encoded (i.e., the original source symbol sequence 102 in FIG. 1) may be received by the device 410 through various devices. For example, the data may be stored in non-removable memory 441 and loaded into memory space 437 associated with the program data in system memory 430. Alternatively, the data to be encoded may be stored on floppy disk 452 or CD/DVD 456 and read into memory space 437 through memory interface 450 and disks reader 451 or 455. Still alternatively, the data to be encoded may be input through keyboard 462 by a user or through network interface 470 from remote computer 480. According to a further embodiment, the source symbol sequence may be generated from input data that are in various formats. For example, the input data may be in the ASCII text format, the Microsoft Word format, the HTML format, the XML format, the PDF format, or other suitable proprietary formats. Still alternatively, the input data also include multimedia contents such as audio or video data and the source symbol sequence to be encoded is extracted from these multimedia contents. For example, the input data include a sequence of video frames, each of which has an array of pixels. The source symbol sequence is generated by rearranging the array of pixels.

When a further instruction is received for executing the encoding process, the program codes including the instructions are read from memory space 435 and interpreted by processing unit 420. The program codes may instruct processing unit 420 to load the data that is previously received and stored in memory space 437 and processing the data according to the method described herein. During the process of the encoding, intermediate data and encoding parameters including the key stream may be stored in memory space 437 associated with the program data or in the internal registers of processing unit 420. When the encoding is completed, the encoded data stream may be stored in memory space 437 for subsequent processing or utilized by other programs. Alternatively, the encoded data stream may be output to non-removable memory 441 or the removable memory including floppy disks 452 and CD/DVD 456 for storage. It may be also transmitted to remote computer 480 through network interface 470 over LAN 471 or through modem 472 over WAN 473. Still alternatively, the encoded data stream B may be displayed on display device 491. It may be embedded in other data that are not encoded so that the encoded data stream is displayed as meaningless information along with an indication that the content is encoded and an authorization is required to access the content.

According to some other embodiments, the encoding method and system described herein may also be implemented on proprietary software/hardware system in the form a computer card inserted into the general purpose computer system. Alternatively, it may be implemented in the field-programmable gate array (FPGA) or the application-specific integrated circuit (ASIC).

Performance Analysis

When coding conventions 1 and 2 discussed above both comply with one universal coding technique, it can be easily found that the generated bit stream has the same length as the original universal coding, since in both coding conventions the codeword lengths are the same. Therefore, the secure coding described above will not introduce coding efficiency penalty.

Recall that one unique feature of the universal coding is that there is no need to store any encoding table in the encoder and the decoder. The special structure of the universal coding eases the job of encoding and decoding. In the secure universal coding described above, it can be easily found that this property remains unchanged. In other words, the encoding and decoding operations can be performed without the need of looking up any tables.

With respect to the speed of the encoder, because the only extra operation needed is switching between two coding conventions according to the key stream, the encoding and decoding speeds are almost the same as corresponding regular universal coding. The additional overhead mainly caused by the stream cipher, which can be implemented very efficiently to minimize the impact on the coding efficiency.

Security Analysis

The security of the secure coding techniques described above are evaluated. In particular, the ciphertext attack, the chosen plaintext attack and the chosen-ciphertext attack are analyzed herein.

Ciphertext-Only Attack

In this attack scenario, the attacker can only have access to the encrypted bit stream. Since the information available to the attacker is very limited, a very commonly used approach is the brute-force attack, whose complexity is related to the key space. Because the only private information of the system is the seed used in the stream cipher 204 or the pseudo-random number generator 224 and it is of length 128 bits, then the key space is $2^{128}$, which ensures satisfactory level of security for digital rights management applications.

Alternatively, the attacker may wish to recover the key stream $K=k_1k_2 \ldots k_N$ used to control the switching between the two coding conventions. Since each $k_i$ is one bit, we can see that the complexity of finding the key stream is $2^N$. In order to make this complexity sufficiently large, a constraint is imposed on the input sequence length, i.e., $$N>128, \quad (1)$$

which ensures that $2^N > 2^{128}$. Provided that (1) holds, the attacker would rather use the brute-force attack to break the seed used in the stream cipher. Therefore, the key size is preferably large so as to prevent the brute-force attack.

Another large class of ciphertext-only attack is based on the analysis of statistical properties of the output bitstream 106. Ideally, the bits in the encoded bitstream 106 should be identical independent and identically distributed. Otherwise, the dependence between different bits may provide some information that can be exploited by the attacker to infer the secret key. It is thus important to investigate the statistics of encoded bitstream 106 in order to evaluate the practical security of the proposed system. To this end, the following proposition is developed.

Proposition 1: In the encoded bitstream, $p(B_i=0)=p(B_i=1)=\frac{1}{2}$, where $B_i$ is a bit value in the encoded bitstream. Proof: Let $C_1$ and $C_2$ be the events that the coding convention 1 and the coding convention 2 are used, respectively. Let $E_1=\{B_i$ is from the leading bits$\}$, $E_2=\{B_i$ is from the separator bit$\}$, and $E_3=\{B_i$ is from the message$\}$. Assume that the occurrence probability of codeword $a_i$ is $p(a_i)=2^{-l(ai)}$, where $l()$ denotes the length of the corresponding codeword $a_i$. Then $p(B_i=0)$ can be calculated as follows:

$$p(B_i = 0) = \sum_{m=1}^{2} p(B_i = 0 \mid C_m)p(C_m) \quad (2)$$

$$= \frac{1}{2}\sum_{m=1}^{2} p(B_i = 0 \mid C_m)$$

$$= \frac{1}{2}\sum_{m=1}^{2}\sum_{n=1}^{3} p(B_i = 0 \mid C_m, E_n)p(E_n)$$

$$= \frac{1}{2}\sum_{m=1}^{2}\sum_{n=1}^{3}\sum_{j=1}^{\infty} p(B_i = 0 \mid C_m, E_n, A_j)p(E_n)p(A_j)$$

$$= \frac{1}{2}\left[p(E_1) + p(E_2) + \sum_{j=1}^{\infty}(2^{-j})p(E_3)\right]$$

$$= \frac{1}{2}$$

This completes the proof

Hence, the numbers of zeros and ones in the encoded bit stream 106 are balanced. Therefore, the proposed system is secure against the ciphertext-only attack.

Chosen Plaintext Attack and the Chosen-Ciphertext Attack

As described above, because the period of the key stream is so large that the key stream will not repeat within the period of using it and because of the constantly changing nature of the key stream in the secure encoder, these attacks will become invalid. From another perspective, even if the attacker can somehow find a key stream, however, it is useless because this key stream will not be used again.

Although some exemplary embodiments of the invented injection-enhanced injection-locked frequency divider are disclosed here, it is not intended to unnecessarily limit the scope of the invention. Thus, simple modifications or variations without departing from the principle or the extent of the claims are still within the scope of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for encrypting data comprising:
    obtaining a symbol and a cipher key from a key stream generated by a stream cipher;
    selecting one of first and second universal coding conventions in accordance with the cipher key; and
    encoding the symbol to a codeword in accordance with the selected universal coding convention.

2. The method of claim 1, wherein the cipher key has a binary value.

3. The method of claim 2, wherein the stream cipher is selected from a group of A5/1, A5/2, FISH, Grain, HC-256, ISAAC, MUGI, PANAMA, Phelix, Pike, Py, Rabbit, RC4, Salsa20, Scream, SEAL, SNOW, SOBER-128, SOSEMANUK, Trivium, Turing, VEST, and WAKE.

4. The method of claim 1, wherein the first universal coding convention specifies a first mapping between the symbol and a first codeword and the second universal coding convention specifies a second mapping between the symbol and a second codeword.

5. The method of claim 4, the method further comprising encoding the symbol to the codeword in according to the mapping specified by the selected universal coding convention, wherein the codeword is one of the first and second codewords.

6. The method of claim 4, wherein the first mapping is specified by a first coding table associated with the first universal coding convention and the second mapping is specified by a second coding table associated with the second universal coding convention, the method further comprising encoding the symbol by searching for the codeword in the coding table associated with the selected universal coding convention.

7. The method of claim 4, wherein the first and second universal coding conventions comply with a coding scheme selected from a group of Elias gamma coding, Elias delta coding, Elias omega coding, Exp-Golomb coding, Fibonacci coding, and Levenstein coding.

8. The method of claim 4, wherein the first and second universal coding conventions comply with different coding schemes selected from a group of Elias gamma coding, Elias delta coding, Elias omega coding, Exp-Golomb coding, Fibonacci coding, and Levenstein coding.

9. The method of claim 1, wherein the cipher key has a value selected from zero (0) and one (1), the method further comprising:
   selecting the first universal coding convention for encoding the symbol when the value of the cipher key is zero (0); and
   selecting the second universal coding convention for encoding the symbol when the value of the cipher key is one (1).

10. A method for encoding a sequence of symbols comprising:
   generating a key stream using a stream cipher, the key stream corresponding to the sequence of symbols; and
   switching between first and second coding tables in accordance with the key stream for encoding the sequence of symbols, wherein the first coding table specifies a first mapping between each one of the sequence of symbols and a first set of codewords and the second coding table specifies a second mapping between each one of the sequence of symbols and a second set of codewords.

11. The method of claim 10, switching between the first and second coding tables in accordance with the key stream for encoding the sequence of symbols further comprising performing the following steps until the sequence of symbols is exhausted:
   (a) retrieving a symbol from the sequence of symbols and a key from the key stream;
   (b) selecting one of the first and second coding tables based on the key;
   (c) searching for a codeword that is mapped to the symbol in the selected coding table; and
   (d) outputting the codeword into a bit stream.

12. The method of claim 10, wherein the key stream has binary values selected from zero (0) and one (1).

13. The method of claim 12, selecting one of the first and second coding tables based on the key further comprising:
   determining the value of the key to be zero (0); and
   selecting the first coding table.

14. The method of claim 12, selecting one of the first and second coding tables based on the key further comprising:
   determining the value of the key to be one (1); and
   selecting the second coding table.

15. The method of claim 10, wherein
   the stream cipher is selected from a group including A5/1, A5/2, FISH, Grain, HC-256, ISAAC, MUGI, PANAMA, Phelix, Pike, Py, Rabbit, RC4, Salsa20, Scream, SEAL, SNOW, SOBER-128, SOSEMANUK, Trivium, Turing, VEST, and WAKE, and
   the first and second coding tables comply with at least one coding scheme selected from a group of Elias gamma coding, Elias delta coding, Elias omega coding, Exp-Golomb coding, Fibonacci coding, and Levenstein coding.

16. A non-transitory computer readable medium having program codes executed by one or more digital processors for encoding a symbol, the program codes comprising:
   instructions for generating a key stream using a stream cipher, the key stream having a key corresponding to the symbol;
   instructions for selecting one of first and second universal coding conventions in accordance with the key, wherein the first universal coding convention specifies a first mapping between the symbol and a first codeword and the second universal coding convention specifies a second mapping between the symbol and a second codeword; and
   instructions for encoding the symbol in accordance with the selected universal coding convention.

17. The non-transitory computer readable medium of claim 16, wherein the key has a value selected from zero (0) and one (1), the program codes further comprising:
   instructions for determining the value of the key to be zero (0);
   instructions for selecting the first universal coding convention in response to the value of the key;
   instructions for obtaining the first codeword associated with the symbol in accordance with the first mapping of the first universal coding convention; and
   instructions for outputting the first codeword.

18. The non-transitory computer readable medium of claim 16, wherein the key has a value selected from zero (0) and one (1), the program codes further comprising:
   instructions for determining the value of the key to be one (1);
   instructions for selecting the second coding table in response to the value of the key;
   instructions for obtaining the second codeword associated with the symbol in accordance with the second mapping of the second universal coding convention; and
   instructions for outputting the second codeword.

19. The non-transitory computer readable medium of claim 17, wherein the stream cipher is selected from a group including A5/1, A5/2, FISH, Grain, HC-256, ISAAC, MUGI, PANAMA, Phelix, Pike, Py, Rabbit, RC4, Salsa20, Scream, SEAL, SNOW, SOBER-128, SOSEMANUK, Trivium, Turing, VEST, and WAKE.

20. The non-transitory computer readable medium of claim 17, wherein the first and second universal coding conventions comply with at least one coding scheme selected from a group of Elias gamma coding, Elias delta coding, Elias omega coding, Exp-Golomb coding, Fibonacci coding, and Levenstein coding.

* * * * *